(12) United States Patent
Tebbs et al.

(10) Patent No.: US 8,700,743 B2
(45) Date of Patent: Apr. 15, 2014

(54) NETWORK CONFIGURATION DEVICE (75) Inventors: Matthew Tebbs, Seattle, WA (US);
Brett Marl, Seattle, WA (US)

(73) Assignee: Pure Networks LLC, Wilmington, DE (US)

( * ) Notice: Subject to any disclaimer, the term of this patent is extended or adjusted under 35 U.S.C. 154(b) by 331 days.

(21) Appl. No.: 11/867,675

(22) Filed: Oct. 4, 2007

(65) Prior Publication Data
US 2009/0055514 A1  Feb. 26, 2009

Related U.S. Application Data (60) Provisional application No. 60/949,618, filed on Jul. 13, 2007.

(51) Int. Cl.
*G06F 15/177* (2006.01)
(52) U.S. Cl.
USPC ........... 709/220; 709/221; 709/228; 370/254; 370/255; 370/351
(58) Field of Classification Search
USPC ........... 709/220, 221, 228; 370/254, 255, 351
See application file for complete search history.

(56) References Cited

U.S. PATENT DOCUMENTS

| | | | |
|---|---|---|---|
| 5,383,178 A | 1/1995 | Unverrich | |
| 5,396,485 A | 3/1995 | Ohno et al. | |
| 5,758,083 A | 5/1998 | Singh et al. | |
| 5,768,483 A | 6/1998 | Maniwa et al. | |
| 5,774,667 A | 6/1998 | Garvey et al. | |
| 5,838,907 A | 11/1998 | Hansen | |
| 5,974,237 A | 10/1999 | Shurmer et al. | |
| 5,978,568 A | 11/1999 | Abraham et al. | |
| 6,006,272 A | 12/1999 | Aravamudan et al. | |
| 6,023,723 A | 2/2000 | McCormick et al. | |
| 6,157,950 A | 12/2000 | Krishnan | |
| 6,456,306 B1 | 9/2002 | Chin et al. | |
| 6,530,018 B2 | 3/2003 | Fleming, III | |
| 6,584,074 B1 | 6/2003 | Vasamsetti et al. | |
| 6,631,118 B1 | 10/2003 | Jones | |
| 6,678,250 B1 | 1/2004 | Grabelsky et al. | |

(Continued)

FOREIGN PATENT DOCUMENTS

| | | |
|---|---|---|
| EP | 1315334 | 5/2003 |
| EP | 1370025 | 12/2003 |

(Continued)

OTHER PUBLICATIONS

U.S. Appl. No. 13/029,335, filed Feb. 17, 2011, entitled "Network Management," Inventor(s) Steven M. Bush, et al.

(Continued)

*Primary Examiner* — Thu Ha Nguyen
(74) *Attorney, Agent, or Firm* — Patent Capital Group (57) ABSTRACT

An article of manufacture includes an interface component configured to couple to a computer, the computer being part of a network having a gateway device. The article further includes a memory component containing computer-implementable instructions that, when executed by the computer, gather network configuration information from the gateway device. The network configuration information is configured to enable an electronic device to join the network.

17 Claims, 5 Drawing Sheets

(56) References Cited

U.S. PATENT DOCUMENTS

| | | |
|---|---|---|
| 6,728,262 B1 | 4/2004 | Woram |
| 6,778,505 B1 | 8/2004 | Bullman et al. |
| 6,801,941 B1 | 10/2004 | Stephens et al. |
| 6,892,245 B1 | 5/2005 | Crump et al. |
| 6,925,085 B1 | 8/2005 | Krishna et al. |
| 6,954,785 B1 | 10/2005 | Martin et al. |
| 6,965,614 B1 | 11/2005 | Osterhout et al. |
| 6,980,556 B2 | 12/2005 | Vimpari |
| 7,020,701 B1 | 3/2006 | Gelvin et al. |
| 7,020,720 B1 | 3/2006 | Donahue et al. |
| 7,027,808 B2 | 4/2006 | Wesby |
| 7,039,688 B2 | 5/2006 | Matsuda et al. |
| 7,042,988 B2 | 5/2006 | Juitt et al. |
| 7,080,141 B1 | 7/2006 | Baekelmans et al. |
| 7,111,054 B2 | 9/2006 | Lo |
| 7,155,493 B1 | 12/2006 | Weber |
| 7,177,957 B2 | 2/2007 | Vance |
| 7,187,461 B2 | 3/2007 | Schlonski et al. |
| 7,200,551 B1 | 4/2007 | Senez |
| 7,240,106 B2 | 7/2007 | Cochran et al. |
| 7,249,171 B2 | 7/2007 | Goto |
| 7,269,653 B2 | 9/2007 | Mentze et al. |
| 7,283,517 B2 | 10/2007 | Yan et al. |
| 7,310,664 B1 | 12/2007 | Merchant et al. |
| 7,319,873 B2 | 1/2008 | Zhang et al. |
| 7,337,910 B2 | 3/2008 | Cartmell et al. |
| 7,340,512 B2 | 3/2008 | Cochran et al. |
| 7,388,839 B2 | 6/2008 | Chafle et al. |
| 7,392,310 B2 | 6/2008 | Motoyama et al. |
| 7,418,702 B2 | 8/2008 | Tsao |
| 7,421,466 B2 | 9/2008 | Haines |
| 7,457,737 B2 | 11/2008 | Patiejunas |
| 7,460,546 B2 | 12/2008 | Anderson, IV |
| 7,475,133 B2 | 1/2009 | Nuggehalli |
| 7,496,660 B2 | 2/2009 | Blaisdell et al. |
| 7,499,999 B2 | 3/2009 | Ocepek et al. |
| 7,506,048 B1 | 3/2009 | Motoyama et al. |
| 7,509,415 B2 | 3/2009 | Baekelmans et al. |
| 7,545,762 B1 | 6/2009 | McConnell et al. |
| 7,565,418 B2 | 7/2009 | Ferrari et al. |
| 7,581,039 B2 | 8/2009 | Martinez et al. |
| 7,603,710 B2 | 10/2009 | Harvey et al. |
| 7,657,612 B2 | 2/2010 | Manchester et al. |
| 7,769,409 B2 | 8/2010 | Harris et al. |
| 7,783,777 B1 | 8/2010 | Pabla et al. |
| 7,787,416 B2 | 8/2010 | Gidwani |
| 7,823,199 B1 | 10/2010 | Rathi et al. |
| 7,853,880 B2 | 12/2010 | Porter |
| 8,159,949 B2 | 4/2012 | Pham |
| 2001/0039580 A1 | 11/2001 | Walker et al. |
| 2002/0004935 A1 | 1/2002 | Huotari et al. |
| 2002/0010866 A1 | 1/2002 | McCullough et al. |
| 2002/0026503 A1* | 2/2002 | Bendinelli et al. ............ 709/220 |
| 2002/0026505 A1 | 2/2002 | Terry |
| 2002/0112076 A1 | 8/2002 | Rueda et al. |
| 2002/0116544 A1 | 8/2002 | Barnard et al. |
| 2002/0147938 A1 | 10/2002 | Hamilton et al. |
| 2002/0161865 A1 | 10/2002 | Nguyen |
| 2002/0161867 A1 | 10/2002 | Cochran et al. |
| 2002/0174207 A1 | 11/2002 | Battou |
| 2002/0191556 A1 | 12/2002 | Krishnarajah et al. |
| 2002/0196463 A1 | 12/2002 | Schlonski et al. |
| 2003/0005112 A1 | 1/2003 | Krautkremer |
| 2003/0018889 A1 | 1/2003 | Burnett et al. |
| 2003/0033402 A1 | 2/2003 | Battat et al. |
| 2003/0040813 A1 | 2/2003 | Gonzales et al. |
| 2003/0041238 A1 | 2/2003 | French et al. |
| 2003/0061336 A1 | 3/2003 | Van Den Bosch et al. |
| 2003/0069947 A1 | 4/2003 | Lipinski |
| 2003/0078965 A1 | 4/2003 | Cocotis et al. |
| 2003/0078999 A1 | 4/2003 | Lund et al. |
| 2003/0086425 A1 | 5/2003 | Bearden et al. |
| 2003/0097439 A1 | 5/2003 | Strayer et al. |
| 2003/0115298 A1* | 6/2003 | Baker ........................ 709/220 |
| 2003/0115314 A1 | 6/2003 | Kawashima |
| 2003/0187985 A1 | 10/2003 | Rohling et al. |
| 2003/0195937 A1 | 10/2003 | Kircher et al. |
| 2003/0200303 A1 | 10/2003 | Chong |
| 2003/0200318 A1 | 10/2003 | Chen et al. |
| 2003/0221122 A1 | 11/2003 | Hatori |
| 2003/0229688 A1 | 12/2003 | Liang |
| 2004/0003292 A1 | 1/2004 | Kato |
| 2004/0005873 A1 | 1/2004 | Groenendaal et al. |
| 2004/0015575 A1 | 1/2004 | Motoyama |
| 2004/0030620 A1 | 2/2004 | Benjamin et al. |
| 2004/0039704 A1 | 2/2004 | Gilliam et al. |
| 2004/0040023 A1 | 2/2004 | Ellis et al. |
| 2004/0049714 A1 | 3/2004 | Marples et al. |
| 2004/0054558 A1 | 4/2004 | Miyake |
| 2004/0083299 A1 | 4/2004 | Dietz et al. |
| 2004/0093383 A1 | 5/2004 | Huang et al. |
| 2004/0111505 A1 | 6/2004 | Callahan et al. |
| 2004/0146006 A1 | 7/2004 | Jackson |
| 2004/0155899 A1 | 8/2004 | Conrad |
| 2004/0156346 A1 | 8/2004 | O'Neill |
| 2004/0162986 A1 | 8/2004 | Metzger |
| 2004/0172469 A1 | 9/2004 | Takahashi et al. |
| 2004/0193709 A1 | 9/2004 | Selvaggi et al. |
| 2004/0199630 A1 | 10/2004 | Sarkissian et al. |
| 2004/0199647 A1 | 10/2004 | Ramarao et al. |
| 2004/0203592 A1 | 10/2004 | Kermode et al. |
| 2004/0204051 A1 | 10/2004 | Scott et al. |
| 2004/0236759 A1 | 11/2004 | Young |
| 2004/0255023 A1 | 12/2004 | Motoyama |
| 2005/0004866 A1 | 1/2005 | Bonalle et al. |
| 2005/0005013 A1 | 1/2005 | Saint-Hilaire et al. |
| 2005/0018241 A1 | 1/2005 | Azami |
| 2005/0050189 A1 | 3/2005 | Yang |
| 2005/0050190 A1 | 3/2005 | Dube |
| 2005/0054326 A1 | 3/2005 | Rogers |
| 2005/0060535 A1 | 3/2005 | Bartas |
| 2005/0063350 A1 | 3/2005 | Choudhury et al. |
| 2005/0078681 A1 | 4/2005 | Sanuki et al. |
| 2005/0085244 A1 | 4/2005 | Choi et al. |
| 2005/0086197 A1 | 4/2005 | Boubez et al. |
| 2005/0086282 A1 | 4/2005 | Anderson et al. |
| 2005/0091504 A1 | 4/2005 | Shirogane |
| 2005/0111420 A1 | 5/2005 | Fuji |
| 2005/0114490 A1 | 5/2005 | Redlich et al. |
| 2005/0125527 A1 | 6/2005 | Lu et al. |
| 2005/0149626 A1 | 7/2005 | Manchester et al. |
| 2005/0160138 A1* | 7/2005 | Ishidoshiro ................ 709/203 |
| 2005/0165828 A1 | 7/2005 | Lango et al. |
| 2005/0165919 A1 | 7/2005 | Qian et al. |
| 2005/0184852 A1 | 8/2005 | Lee et al. |
| 2005/0198221 A1 | 9/2005 | Manchester et al. |
| 2005/0198274 A1 | 9/2005 | Day |
| 2005/0216602 A1 | 9/2005 | Armstrong et al. |
| 2005/0229238 A1 | 10/2005 | Ollis et al. |
| 2005/0234568 A1 | 10/2005 | Chung et al. |
| 2005/0234683 A1 | 10/2005 | Graves et al. |
| 2005/0235227 A1 | 10/2005 | Martineau et al. |
| 2005/0240665 A1 | 10/2005 | Gu et al. |
| 2005/0240758 A1 | 10/2005 | Lord et al. |
| 2005/0243777 A1 | 11/2005 | Fong |
| 2006/0015939 A1 | 1/2006 | Aston et al. |
| 2006/0031457 A1 | 2/2006 | Motoyama |
| 2006/0036847 A1 | 2/2006 | Bush et al. |
| 2006/0037036 A1 | 2/2006 | Min et al. |
| 2006/0037075 A1 | 2/2006 | Frattura et al. |
| 2006/0041891 A1 | 2/2006 | Aaron |
| 2006/0101109 A1 | 5/2006 | Nishio |
| 2006/0106918 A1 | 5/2006 | Evert et al. |
| 2006/0120293 A1 | 6/2006 | Wing |
| 2006/0129664 A1 | 6/2006 | Reimert et al. |
| 2006/0153080 A1 | 7/2006 | Palm |
| 2006/0168195 A1 | 7/2006 | Maturana et al. |
| 2006/0168263 A1 | 7/2006 | Blackmore |
| 2006/0172734 A1 | 8/2006 | Tak et al. |
| 2006/0258341 A1 | 11/2006 | Miller et al. |
| 2006/0272014 A1 | 11/2006 | McRae et al. |
| 2006/0280189 A1 | 12/2006 | McRae et al. |
| 2006/0291443 A1 | 12/2006 | Harrington et al. |
| 2007/0015463 A1 | 1/2007 | Abel |

(56) References Cited

U.S. PATENT DOCUMENTS

| | | | |
|---|---|---|---|
| 2007/0022185 A1* | 1/2007 | Hamilton et al. | 709/220 |
| 2007/0058567 A1 | 3/2007 | Harrington et al. | |
| 2007/0076621 A1 | 4/2007 | Malhotra et al. | |
| 2007/0106768 A1 | 5/2007 | Frietsch et al. | |
| 2007/0111568 A1 | 5/2007 | Ferrari et al. | |
| 2007/0115950 A1 | 5/2007 | Karaoguz et al. | |
| 2007/0130286 A1 | 6/2007 | Hopmann et al. | |
| 2007/0133569 A1 | 6/2007 | Lee et al. | |
| 2007/0143749 A1 | 6/2007 | Date et al. | |
| 2007/0146782 A1 | 6/2007 | Lehotsky et al. | |
| 2007/0204150 A1 | 8/2007 | Jokela et al. | |
| 2007/0253384 A1* | 11/2007 | Kanagala et al. | 370/338 |
| 2007/0254609 A1* | 11/2007 | Rosenthal et al. | 455/127.1 |
| 2007/0268506 A1 | 11/2007 | Zeldin | |
| 2007/0268514 A1 | 11/2007 | Zeldin et al. | |
| 2007/0268515 A1 | 11/2007 | Freund et al. | |
| 2007/0268516 A1 | 11/2007 | Bugwadia et al. | |
| 2007/0276931 A1 | 11/2007 | Mahdavi et al. | |
| 2007/0291945 A1 | 12/2007 | Chuang et al. | |
| 2008/0008125 A1* | 1/2008 | Pham et al. | 370/329 |
| 2008/0037552 A1 | 2/2008 | Dos Remedios et al. | |
| 2008/0043989 A1 | 2/2008 | Furutono et al. | |
| 2008/0049779 A1 | 2/2008 | Hopmann et al. | |
| 2008/0052384 A1 | 2/2008 | Marl et al. | |
| 2008/0065760 A1 | 3/2008 | Damm et al. | |
| 2008/0070603 A1 | 3/2008 | Mao | |
| 2008/0134164 A1 | 6/2008 | Stich et al. | |
| 2008/0175187 A1* | 7/2008 | Lowry et al. | 370/328 |
| 2008/0216154 A1* | 9/2008 | Fontaine | 726/3 |
| 2008/0243699 A1 | 10/2008 | Hilerio et al. | |
| 2009/0017832 A1 | 1/2009 | Tebbs et al. | |
| 2009/0019141 A1 | 1/2009 | Bush et al. | |
| 2009/0019147 A1 | 1/2009 | Ahlers et al. | |
| 2009/0019314 A1 | 1/2009 | Younger et al. | |
| 2009/0037606 A1 | 2/2009 | Diab | |
| 2009/0046656 A1 | 2/2009 | Kitazoe et al. | |
| 2009/0052338 A1 | 2/2009 | Kelley et al. | |
| 2009/0109897 A1 | 4/2009 | Woo | |
| 2010/0020694 A1 | 1/2010 | Jones | |
| 2010/0035595 A1 | 2/2010 | Duggal et al. | |
| 2010/0093278 A1 | 4/2010 | Abel | |
| 2010/0250725 A1* | 9/2010 | Meenan et al. | 709/223 |
| 2011/0235549 A1* | 9/2011 | Ahlers et al. | 370/255 |
| 2012/0008529 A1* | 1/2012 | Averbuch et al. | 370/255 |
| 2013/0046722 A1* | 2/2013 | Hanson | 706/47 |
| 2013/0250801 A1* | 9/2013 | Kennedy et al. | 370/254 |

FOREIGN PATENT DOCUMENTS

| | | |
|---|---|---|
| EP | 1538792 | 6/2005 |
| EP | 1553729 | 7/2005 |
| EP | 1638258 | 3/2006 |
| EP | 1639751 A1 | 3/2006 |
| EP | 1701478 A1 | 9/2006 |
| EP | 1894314 A2 | 3/2008 |
| EP | 1965541 A1 | 9/2008 |
| EP | 2324652 A1 | 5/2011 |
| GB | 2411801 | 9/2005 |
| JP | 2001-222497 A | 8/2001 |
| JP | 2001-352328 A | 12/2001 |
| KR | 2004-0047209 A1 | 7/2004 |
| KR | 10-2005-0031175 A | 4/2005 |
| KR | 2005-0078541 A | 8/2005 |
| KR | 2005-0094247 A | 9/2005 |
| WO | WO2005/004401 | 1/2005 |
| WO | WO2007/001629 | 1/2007 |
| WO | WO2007/136804 | 11/2007 |
| WO | WO 2008/156898 | 12/2008 |
| WO | WO 2009/011962 | 1/2009 |
| WO | WO 2009/011963 | 1/2009 |
| WO | WO 2009/011964 | 1/2009 |
| WO | WO 2009/011965 | 1/2009 |
| WO | WO 2009/011966 | 1/2009 |
| WO | WO2010/016855 | 2/2010 |
| WO | WO2011/119264 | 9/2011 |

OTHER PUBLICATIONS

U.S. Appl. No. 13/030,982, filed Feb. 18, 2011, entitled "Network Management," inventor(s) Steven M. Bush, et al.

U.S. Appl. No. 13/031,121, filed Feb. 18, 2011, entitled "Network Management," inventor(s) Steven M. Bush, et al.

Marcia Zangrilli, et al., "Using Passive Traces of Application Traffic in a Network Monitoring System," copyright 2004 IEEE.

Kazuya Kubo, et al., "Hybrid Peer-to-Peer System for Network Monitoring of Field Devices," Downloaded May 14, 2009 at 10:08 from IEEE Xplore, copyright 2003 SICE, 6 pages.

International Search Report for International Application No. PCT/US2008/063335 mailed Sep. 22, 2008 (1 page).

Written Opinion of the International Searching Authority for International Application No. PCT/US2008/063335 mailed Sep. 22, 2008 (4 pages).

International Search Report for International Application No. PCT/US2008/063308 mailed Oct. 30, 2008 (2 pages).

Written Opinion of the International Searching Authority for International Application No. PCT/US2008/063308 mailed Oct. 30, 2008 (4 pages).

International Search Report for International Application No. PCT/US2008/063333 mailed Sep. 26, 2008 (2 pages).

Written Opinion of the International Searching Authority for International Application No. PCT/US2008/063333 mailed Spetember 26, 2008 (4 pages).

International Search Report for International Application No. PCT/US2008/059490 mailed Apr. 21, 2009 (2 pages).

International Preliminary Report on Patentability issued Oct. 6, 2009 (1 page) and Written Opinion of the International Searching Authority mailed Apr. 21, 2009 (3 pages) for International Application No. PCT/US2008/059490.

Notification Concerning Transmittal of International Preliminary Report on Patentability (1 page), International Preliminary Report on Patentability (1 page), and Written Report of the International Searching Authority (4 pages) mailed Jan. 28, 2010 for International Application No. PCT/US2008/063318.

PCT Aug. 25, 2011 International Search Report and Written Opinion of the International Searching Authority from International Application No. PCT/US2011/024462; 12 pages.

Karygiannos, Tom, et al., "Wireless Network Security 802.11 Bluetooth and Handheld Devices," NIST Special Publication 800-48, Technology Administration, Dept. of Commerce, 2002, 119 pages.

U.S. Appl. No. 13/235,007, filed Sep. 16, 2011, entitled "Configuring a Secure Network," Inventor(s) Aaron H. Averbuch, et al.

EPO Nov. 15, 2007 European Search Report and Opinion from European Application No. EP07017509; 8 pages.

Khedr, Mohamed, et al., "Acan-Ad Hoc Context Aware Networks," Online! 2002, XP002300569; 5 pages http://citeseerx.ist.psu.edu/viewdoc/summary?doi=10.1.1.20.1469.

Krishnamurthy, Lakshman, et al., "Meeting the Demands of the Digital Home with high-Speed Multi-Hop Wireless Networks," Intel Technology Journal, vol. 6, Nov. 15, 2002, pp. 57-68; http://download.intel.com/technology/itj/2002/volume06issue04/vol6iss4_interoperable_home_infrastructure.pdf.

"Near Field Communication White Paper," Ecma International, 2005; 12 pages http://www.ecma-international.org/activities/Communications/tc32-tg19-2005-012.pdf.

PCT Oct. 27, 2004 International Search Report from International Application No. PCT/US2004/021429; 3 pages.

PCT Jan. 3, 2006 International Preliminary Report on Patentability and Written Opinion of the International Search Authority from International Application No. PCT/US2004/021429; 7 pages.

PCT Dec. 24, 2007 International Preliminary Report on Patentability and Written Opinion of the International Search Authority from International Application No. PCT/US2006/17500; 6 pages.

PCT Aug. 7, 2007 International Search Report from International Application No. PCT/US06/17500; 1 page.

(56) References Cited

OTHER PUBLICATIONS

PCT Nov. 21, 2008 International Preliminary Report on Patentability and Written Opinion of the International Search Authority from International Application No. PCT/US2007/012016; 5 pages.
PCT Jan. 4, 2008 International Search Report from International Application No. PCT/US07/12016; 1 page.
PCT Apr. 24, 2009 International Search Report from International Application No. PCT/US2008/08544; 2 pages.
PCT Aug. 2, 2011 International Preliminary Report on Patentability and Written Opinion of the International Search Authority from International Application No. PCT/US2008/08544; 7 pages.
Rasheed, Yasser, et al, "Home Interoperability Framework for the Digital Home," Intel Technology Journal, vol. 6, Nov. 15, 2002, pp. 5-16; http://download.intel.com/technology/itj/2002/volume06issue04/vol6iss4_interoperable_home_infrastructure.pdf.
"Universal Plug and Play Device Architecture, UPnP, Version 1.0," Microsoft Corporation, Protocols, Jun. 8, 2000; 54 pages http://upnp.org/specs/arch/UPnPDA10_20000613.pdf.
Walker, Mark, et al., "Remote I/O: Freeing the Experience from the Platform with UPnP Architecture," Intel Technology Journal, vol. 6, Nov. 15, 2002, pp. 30-36; http://download.intel.com/technology/itj/2002/volume06issue04/vol6iss4_interoperable_home_infrastructure.pdf.
PCT Oct. 11, 2012 Notification Concerning Transmittal of International Preliminary Report on Patentability and the International Preliminary Report on Patentability and Written Opinion of the International Searching Authority from Application No. PCT/US2011/024462; 9 pages.
EPO—Oct. 24, 2012 Response to Written Opinion from European Application 0876920.4; 21 pages.
PCT Notification of the International Search Report and the Written Opinion of the International Searching Authority, or the Declaration, International Application No. PCT/US2008/063318, mailed Sep. 25, 2008, 6 pages.
U.S. Appl. No. 11/696,638, filed Apr. 4, 2007, entitled "Network Management Providing Network Health Information and Lockdown Security," Inventor(s) Steve Bush et al.
Barb Bowman, "Introduction to Windows XP Service Pack 2," Published Aug. 25, 2004, 8 pages; © 2010 Microsoft Corporation http://www.microsoft.com/windowsxp/using/security/expert/bowman_introtosp2.mspx.
Microsoft TechNet, "The Cable Guy—Jun. 2004: The New Wireless Network Setup Wizard in Windows XP Service Pack 2," Published May 25, 2004; Updated Aug. 4, 2004, 10 pages; © 2010 Microsoft Corporation; http://technet.microsoft.com/en-us/library/bb878069.aspx.
Microsoft Corporation, "Windows Connect Now-UFD for Windows XP Specification," © 2010, Updated Sep. 15, 2006, 1 page; http://www.microsoft.com/whdc/connect/Rally/WCN-UFD_XPspec.mspx.
Microsoft Corporation, "Windows Connect Now-UFD for Windows XP," Version 1.1 © 2010—Sep. 15, 2006, 33 pages; http://www.microsoft.com/whdc/connect/Rally/WCN-Netspec.doc.
Microsoft Corporation, "Windows Connect Now-UFD and Windows Vista Specification," Version 1.0 © 2010—Sep. 15, 2006, 1 page; http://www.microsoft.com/whdc/connect/Rally/WCN-UFD_Vistaspec.mspx.
Microsoft Corporation, "Windows Connect Now-UFD Windows Vista" Version 1.0 © 2010—Sep. 15, 2006, 28 pages; http://www.microsoft.com/whdc/connect/Rally/WCN-UFD_Vistaspec.doc.
Microsoft Corporation, "Windows Connect Now—Access Point has No USB Port in Wireless Networking," © 2010, printed Mar. 24, 2010, 2 pages; http://www.microsoft.com/communities/newsgroups/en-us/default.aspx?dg=microsoft.public.windows.networking.wireless&tid=c55b567e-fec3-43be-8bd1-a3216125c7f9&cat=en_US_d02fc761-3f6b-402c-82f6-ba1a8875c1a7&lang=en&cr=&sloc=en-us&m=1&p=1.
Flip Video, "Quick Start Guide: FlipshareTV," © 2009 Cisco Systems, Inc., 19 pages; http://www.theflip.com/pdf/en-US/FlipShareTVQuickStartGuide.pdf.
"Wi-Fi Certified™ for Wi-Fi Protected Setup™: Easing the User Experience for Home and Small Office Wi-Fi® Networks," © 2007, 14 pages; http://www.wi-fi.org/files/kc/20090123_Wi-Fi_Protected_Setup.pdf.
"Cisco Access Router USB Flash Memory Module and Usb eToken Hardware Installation Guide," © 2006 Cisco Systems, Inc., 12 pages; https://www.cisco.com/en/US/docs/routers/access/2800/hardware/notes/mithril.html.
"Wi-Fi Alliance™ for Wi-Fi Protected Setup Specification," Version 1.0h, Dec. 2006, 110 pages.
Byoung-Koo Kim/Jong-Su Jang/Tai M. Chung, Design of Network Security Control System for Cooperative Intrusion Detection, 2002, pp. 389-398.
International Preliminary Report on Patentability issued Jan. 19, 2010 (1 page) and Written Opinion of the International Searching Authority mailed Oct. 30, 2008 (4 pages) for International Application No. PCT/US2008/063308.
International Preliminary Report on Patentability issued Jan. 19, 2010 (1 page) and Written Opinion of the International Searching Authority mailed Sep. 26, 2008 (4 pages) for International Application No. PCT/US2008/063333.
International Preliminary Report on Patentability issued Jan. 19, 2010 (1 page) and Written Opinion of the International Searching Authority mailed Sep. 22, 2008 (4 pages) for International Application No. PCT/US2008/063335.
EPO Apr. 5, 2012 Search Report and Written Opinion from European Application 08769420.4; 8 pages.

\* cited by examiner

NETWORK CONFIGURATION DEVICE

PRIORITY CLAIM

This application claims priority from U.S. Provisional Patent Application No. 60/949,618, filed Jul. 13, 2007, entitled "ADDING NETWORK INTELLIGENCE TO A REMOVABLE DEVICE," which is hereby incorporated by reference in its entirety as if fully set forth herein.

FIELD OF THE INVENTION

Embodiments of the present invention are generally directed to computer networks and, more particularly, to a system for conveniently adding devices to a network.

BACKGROUND OF THE INVENTION

The proliferation of wireless-enabled laptops has created demand for wireless networks in the home. Consumers can purchase wireless routers (or access points) at electronics stores and add them to their existing ISP connection to create their own wireless access to broadband networks.

Transmissions between a laptop and an access point are typically unsecured. These transmissions often happen in clear-text, and a malicious user with limited skill can a) snoop on the conversation that is occurring between the laptop and the network and b) gain access to the network and resources on the internet. Fortunately, most routers and access points have the ability to enable wireless security. In doing so, a secret password is shared between all devices that want to communicate with the access point.

By default, typically, such devices ship with wireless security disabled. The act of enabling wireless security on these devices is challenging and complex to the average home user.

Wireless security is a complex field. There are many different types of wireless security available, such as WEP, WPA, WPA-PSK, WPA-RADIUS, WPA2, that often involve complex 'hexadecimal keys' or pass-phrases and sub-choices of encryption methods (TKIP/AES, etc). The method of securing a wireless network involves configuring the desired security settings inside the router and then configuring each wireless client with the same settings and pass-phrases.

To further complicate things, each device requiring configuration may have a very different user experience. For example, the router may have a difficult-to-navigate web-based administration console, different versions of Windows have different user interfaces, a Mac in the home would require a different approach, and finally "headless devices" that don't have a display console, such as a network enabled web-camera or networked Digital Video Recorder, may have yet a very different user interface.

Some efforts have been made by the industry to improve on the simplification of wireless network security. For example, the Microsoft Corporation has developed an approach known as "Windows Connect Now" (WCN) that allows wireless security configuration information to be stored in an XML file on removable storage devices such as USB keys. The Wi-Fi Alliance has been driving a set of standards around wireless configuration known as Wi-Fi Protected Setup (WPS).

However, the current industry efforts fall short in a number of areas. For example, the WPS wizards in Windows XP and Vista may allow for creation of new network settings onto a USB key. This helps with wireless clients that support the key format, but it does not help users reconfigure their existing router settings to match. This is a complex task that users often do not know how to complete. Additionally, there are no standard APIs to program routers. Most of them support a web-based administrative interface, but not a well structured API set. Moreover, WPS is hindered by many conflicting ways of accomplishing the same goal (e.g., PIN based configuration, Push-Button configuration etc.)

Once wireless security has been configured and enabled on a network, the task of adding a new device to that network is also complex; as it requires client configuration of the same settings. In many cases, a new device is added to the network a considerable amount of time after the network was originally secured, in which case the settings have been long forgotten.

BRIEF SUMMARY OF THE INVENTION

An embodiment of the invention includes an article of manufacture having an interface component configured to couple to a computer, the computer being part of a network having a gateway device. The article further includes a memory component containing computer-implementable instructions that, when executed by the computer, gather network configuration information from the gateway device. The network configuration information is configured to enable an electronic device to join the network.

BRIEF DESCRIPTION OF THE DRAWING

Preferred and alternative embodiments of the present invention are described in detail below with reference to the following figures.

DETAILED DESCRIPTION OF THE INVENTION

As is described in further detail below, various embodiments of the invention may employ elements of a network management tool. An embodiment of the network management tool, available from Pure Networks under the name NETWORK MAGIC, is described in detail in U.S. Provisional Patent Application No. 60/634,432, filed Dec. 7, 2004, entitled "Network Management" and naming Steve Bush et al. as inventors, and U.S. patent application Ser. No. 11/297,809, filed on Dec. 7, 2005, entitled "Network Management" and naming Steve Bush et al. as inventors, which applications, along with commonly owned U.S. Provisional Patent Application No. 60/789,522, filed Apr. 4, 2006, entitled "Network Management," U.S. patent application Ser. No. 10/916,642, filed on Aug. 10, 2004, entitled "Service Licensing And Maintenance For Networks," U.S. patent application Ser. No. 11/457,783, filed on Jul. 14, 2006, entitled "Network Device Management," and U.S. patent application Ser. No. 11/457,763, filed on Jul. 14, 2006, entitled "Network Device Setup Utility," are incorporated entirely herein by reference.

Figure 1:
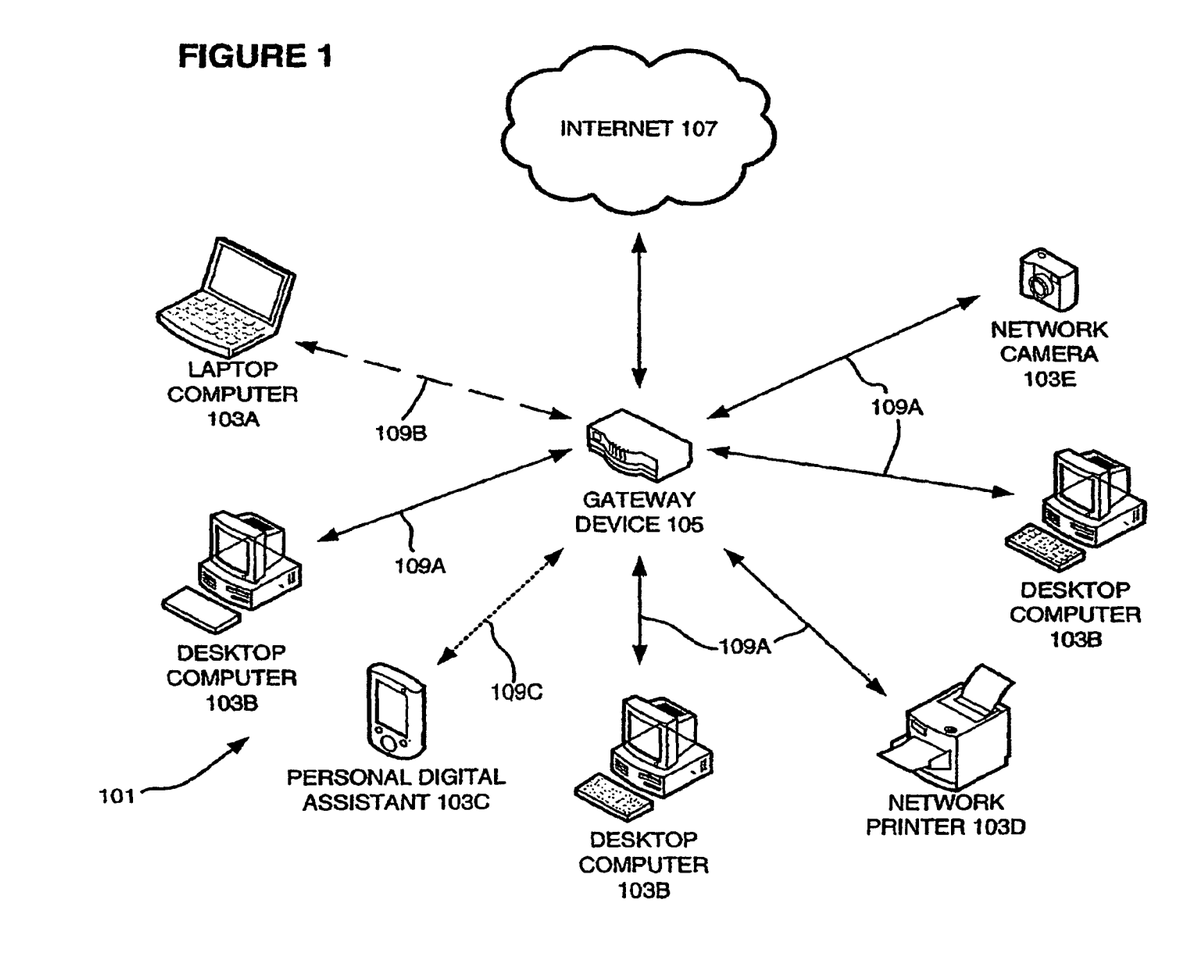
FIG. 1 is a functional block diagram of a network operating environment in which an embodiment of the present invention may be implemented.

Additionally, various embodiments of the invention may be employed within a small network. FIG. 1 illustrates an example of this type of small network. The network 101 may include a variety of different computing devices or "nodes".

For example, the network 101 may include one or more laptop computers 103A, one or more desktop computers 103B, and one or more personal digital assistants 103C. In addition to these computers, the network 101 may also include one or more computing appliances, which are not as versatile as a conventional programmable computer, but which nonetheless may be configured to exchange data over a network. Such network appliances may include, for example, one or more printers 103D and one or more cameras 103E, as illustrated in FIG. 1. Other small networks that can be used with various aspects of the invention may include any suitable computing devices, such as telephones that exchange voice information in data packets (sometimes generically referred to as "Voice over Internet Protocol (VoIP) telephones), digital video recorders, televisions, streaming media players, and digital music servers, among others.

Each of these networked devices 103 communicates, either directly or indirectly, with a gateway device 105. In turn, the gateway device 105 typically will communicate with an external device or network. An external network may be another private network, or it may be a public network, such as the Internet 107. Thus, a gateway device is a device that can steer electronic data from one network to another network. Typically, a gateway device serves as a node on two incompatible networks (i.e., networks that use different communication protocol formats) and it can convert data from one network's communication protocol format into the other network's communication protocol format. As used herein, the term "small network" refers to a network made up of networked devices that each employ the same network address to communicate with the same gateway device, together with the gateway device itself.

The network devices 103 may be connected to the gateway device 105 using any suitable communication medium. For example, in the illustrated network 101, the desktop computers 103B are connected to the gateway device 105 through a hard-wired connection 109A (such as an Ethernet cable), while the laptop computer 103A is connected to the gateway device 105 through a IEEE 802.11 wireless connection 109B and the personal digital assistant 103C is connected to the gateway device 105 through a Bluetooth wireless connection 109C.

It should be appreciated that, as used throughout this application, the term "connect" and its derivatives (e.g., connection, connected, connects) includes both direct and indirect connections. Thus, with the network illustrated in FIG. 1, the laptop computer 103A may be connected to the gateway device 105 using a wireless transceiver incorporated into the laptop computer 103A and a wireless transceiver incorporated into the gateway device 105. Alternately, the laptop computer 103A may be connected to the gateway device 105 using a wireless transceiver external to the laptop computer 103, the gateway device 105, or both.

Typically, the gateway device 105 will be a router. As will be appreciated by those of ordinary skill in the art, a router routes data packets from the networked devices 103 to an external device or network. With some networks, however, the gateway device 105 alternately may be a computer performing router functions, a hub, a bridge, or "layer-3" switch. As will also be appreciated by those of ordinary skill in the art, the computing devices or "nodes" making up the network 101 can communicate with the gateway device 105 using one or more defined communication protocols, such as the Transmission Control Protocol (TCP) and the Internet Protocol (IP).

With these communication protocols, each computing device 103 and gateway device 105 in the network 101 can be assigned a logical address. For example, if the network 101 is connected to the Internet 107 through an Internet service provider, the Internet service provider can assign the gateway device 105 a logical Internet Protocol (IP) address. The Internet service provider may also provide the gateway device 105 with a block of logical Internet Protocol (IP) addresses for the gateway device 105 to reassign to each network device 103. Alternatively, the gateway device 105 can itself assign a range of logical Internet Protocol (IP) addresses to each network device 103, and then use a translation operation (e.g., a Network Address Translation (NAT) operation) to route data packets that it receives to the appropriate network device 103. This type of logical address typically is unrelated to the particular computing device to which it is assigned. Instead, a logical address identifies the relationship of that computing device to other computing devices in the network.

In addition to a logical address, each network device has a physical address. For example, most computing devices capable of communicating over a network, including routers, employ a network adapter with a media access control (MAC) address. This type of physical address is assigned to a network adapter according to standards (referred to as Project 802 or just 802 standards, which are incorporated entirely herein by reference) set forth by the Institute of Electrical and Electronic Engineers (IEEE). More particularly, these standards define a 48-bit and 64-bit physical address format for network devices. The first 14 bits of the address are assigned by the IEEE Registration Authority, and uniquely identify the manufacturer of the network adapter. The remaining bits are then assigned by the manufacturer to uniquely identify each network adapter produced by the manufacturer. Consequently, the physical address of a network adapter is unique across all networks unless manually changed by the user. The physical address is unique to the network adapter, and is independent of a computing device's relationship to other computing devices in a network. Thus, the physical address does not change over time or between uses in different networks.

A network may include both virtual devices and physical devices. Physical network devices can then include both computer devices and computing appliance devices. A "computer" may generally be characterized as a device that can be programmed to perform a number of different, unrelated functions. Examples of computers can thus include programmable personal computers, such as desktop computers and laptop computers. In addition, programmable media-purposed computers (e.g., "media adapters and servers"), network attached storage devices, programmable entertainment-purposed computers (e.g., video game consoles), some programmable personal digital assistants and some telephones (such as wireless "smart" telephones) may be characterized as computers in a network. A "computing appliance" then may generally be characterized as a device that is limited to primarily performing only specific functions. Examples of a computing appliance may thus include, for example, printers, cameras, telephones that exchange voice information in data packets (sometimes generically referred to as "Voice over Internet Protocol (VoIP) telephones or telephone adapters), digital video recorders, televisions, voice over Internet protocol (VoIP) adapters, print servers, media adapters, media servers, photo frames, data storage servers, routers, bridges and wireless access points.

As will be appreciated by those of ordinary skill in the art, there may be no clear defining line between "computer" network devices and "computing appliance" network devices in a network. For example, a sophisticated print server may be programmable to additionally or alternately function as a data storage server, while a programmable media-purposed computer or programmable personal digital assistant may have restricted functionality due to limited memory, input devices or output devices. Accordingly, as used herein, the term "computer" can refer to any network device that is capable of implementing a network management tool according to one or more aspects of the invention, such as a personal programmable computer. The term "computer appliance" then can refer to a network device that typically cannot implement a network management tool according to at least one aspect of the invention without additional augmentation. The terms "computing device," "network component," or "electronic device" are then used herein to include both computers and computing appliances.

With conventional networks located in a home, small office or other local environment, a network management tool according to various aspects of the invention can be implemented on, or otherwise executed by, a programmable personal computer, such as a desktop or laptop computer. A general description of this type of computer will therefore now be described.

An illustrative example of such a computer 201 as may be present in the network 101 described above is illustrated in FIG. 2. As seen in this figure, the computer 201 has a computing unit 203. The computing unit 203 typically includes a processing unit 205 and a system memory 207. The processing unit 205 may be any type of processing device for executing software instructions, but can conventionally be a microprocessor device. The system memory 207 may include both a read-only memory (ROM) 209 and a random access memory (RAM) 211. As will be appreciated by those of ordinary skill in the art, both the read-only memory (ROM) 209 and the random access memory (RAM) 211 may store software instructions for execution by the processing unit 205.

Figure 2:
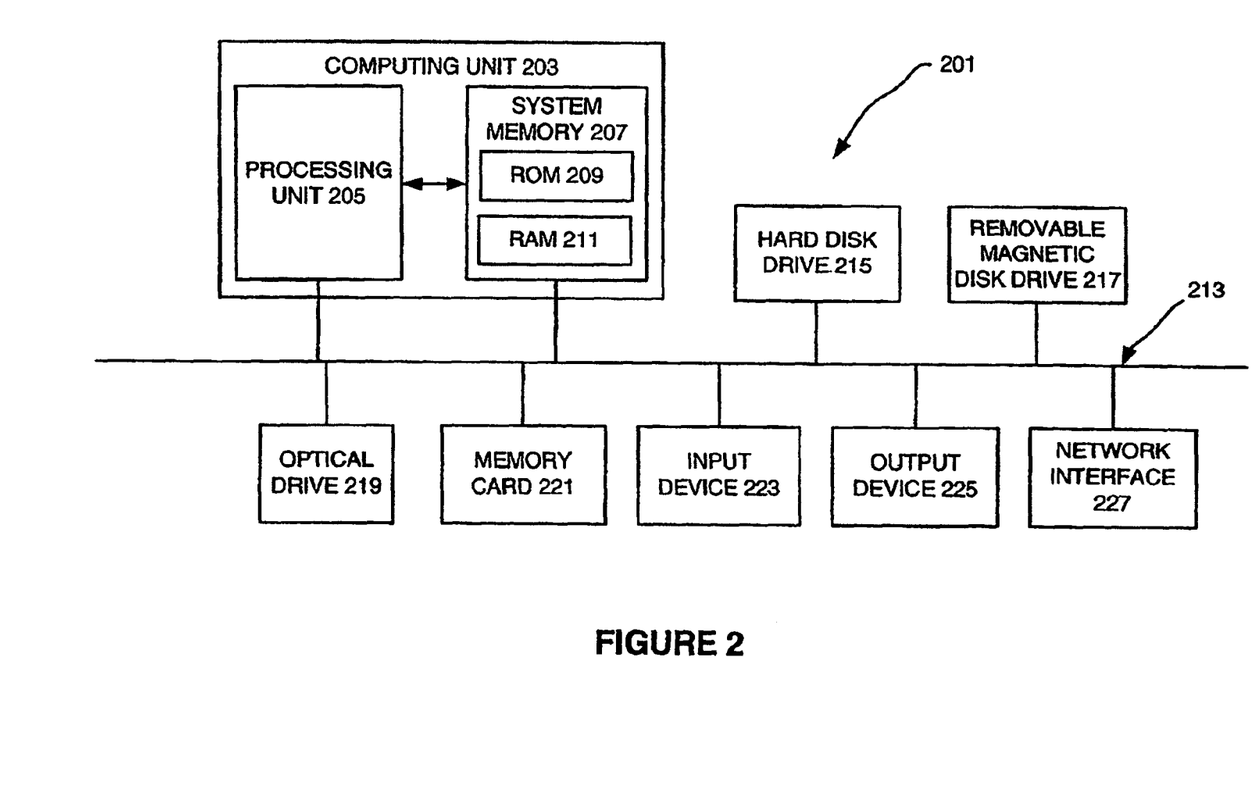
FIG. 2 is a functional block diagram of an operating environment in which an embodiment of the present invention may be implemented.

The processing unit 205 and the system memory 207 are connected, either directly or indirectly, through a bus 213 or alternate communication structure to one or more peripheral devices. For example, the processing unit 205 or the system memory 207 may be directly or indirectly connected to additional memory storage, such as the hard disk drive 215, the removable magnetic disk drive 217, the optical disk drive 219, and the flash memory card 221. The processing unit 205 and the system memory 207 also may be directly or indirectly connected to one or more input devices 223 and one or more output devices 225. The input devices 223 may include, for example, a keyboard, touch screen, a remote control pad, a pointing device (such as a mouse, touchpad, stylus, trackball, or joystick), a scanner, a camera or a microphone. The output devices 225 may include, for example, a monitor display, television, printer, stereo, or speakers.

Still further, the computing unit 203 can be directly or indirectly connected to one or more network interfaces 227 for communicating with a network. This type of network interface 227, also sometimes referred to as a network adapter or network interface card (NIC), translates data and control signals from the computing unit 203 into network messages according to a communication protocol, such as the Transmission Control Protocol (TCP), the Internet Protocol (IP), and the User Datagram Protocol (UDP). These protocols are well known in the art, and thus will not be described here in more detail. An interface 227 may employ any suitable connection agent for connecting to a network, including, for example, a wireless transceiver, a power line adapter, a modem, or an Ethernet connection.

It should be appreciated that one or more of these peripheral devices may be housed with the computing unit 203 and bus 213. Alternately or additionally, one or more of these peripheral devices may be housed separately from the computing unit 203 and bus 213, and then connected (either directly or indirectly) to the bus 213. Also, it should be appreciated that both computers and computing appliances may include any of the components illustrated in FIG. 2, may include only a subset of the components illustrated in FIG. 2, or may include an alternate combination of components, including some components that are not shown in FIG. 2.

It should be noted that, while a general description of a programmable personal computer was provided above, various aspects of the invention may be implemented on any desired device capable of supporting embodiments of the invention. For example, with some aspects of the invention, the network management tool may be implemented on special purposed programmable computers, such as a programmable media or entertainment-purposed computers, or personal digital assistants. Accordingly, the above description of a programmable personal computer should be understood as illustrative rather than limiting.

A computing appliance may have any combination of the components of the computer 201 discussed above. More typically, however, a computing appliance can be simpler to optimize the performance of a specific function, and thus may have only a subset of these components. For example, a computing appliance may have only a computing unit 203, an input device 223 or an output device 225, and a network interface 227. As will be apparent from the following description, however, a computing appliance will have sufficient computing resources to implement a desired embodiment of the invention in order to provide information to or receive information from a client operating on a separate computing device.

Figure 3:
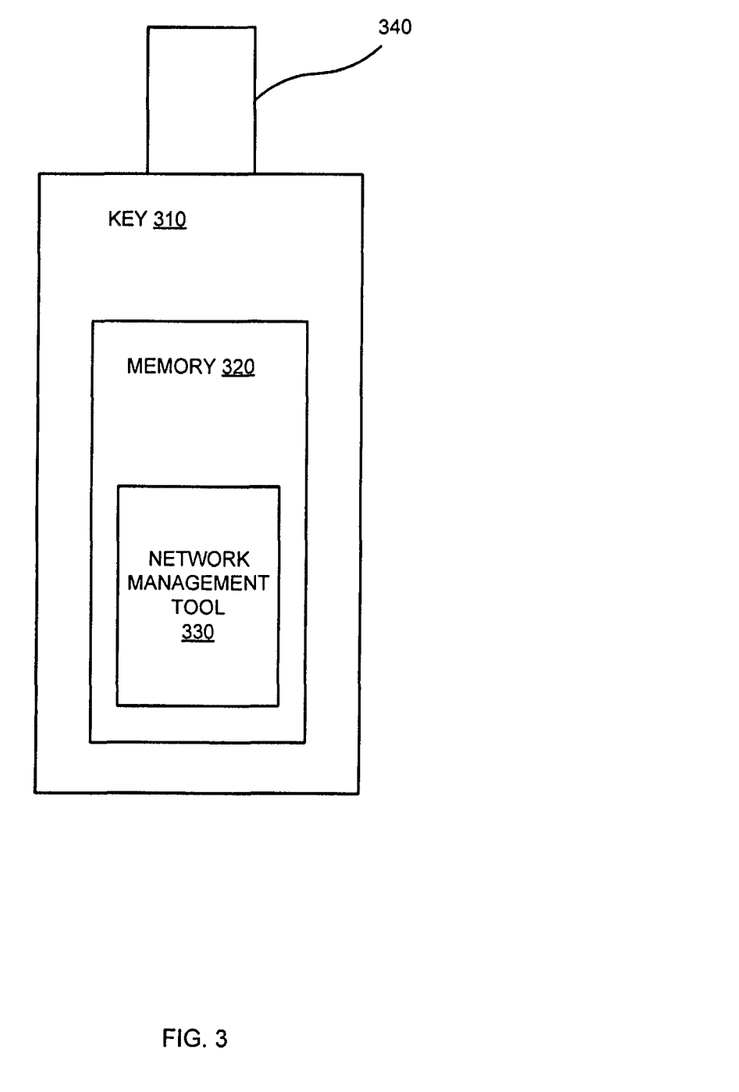
FIG. 3 is a functional block diagram of an operating environment in which an embodiment of the present invention may be implemented.

FIG. 3 illustrates a network configuration device, such as a key 310, according to an embodiment of the invention. In the illustrated example, the key 310 includes a memory component 320 on which is stored a network management tool 330 that may include computer-executable instructions. The key 310 further includes an interface component 340 that is configured to couple to an electronic device. For example, the interface component 340 may include a connector insertable into a USB port of a network device or a transceiver configured to wirelessly communicate with a network device.

Examples and aspects of network management tools, such as the network management tool 330, that may be employed according to various implementations of the invention are discussed in more detail in, for example, U.S. patent application Ser. No. 11/467,534 filed on Aug. 25, 2006, entitled "Network Administration Tool Employing A Network Administration Protocol" and naming Breft Marl as inventor, which application in turn claims priority to U.S. patent application Ser. No. 11/297,809 filed on Dec. 7, 2005, entitled "Network Management" and naming Steve Bush et al. as inventors, which application in turn claims priority to U.S. Provisional Patent Application No. 60/634,432, filed Dec. 7, 2004, entitled "Network Management" and naming Steve Bush et al. as inventors, each of which applications are incorporated entirely herein by reference. U.S. patent application Ser. No. 11/457,783, filed Jul. 14, 2006, entitled "Network Device Management" and naming Brett Marl as inventor is incorporated entirely herein by reference as well.

In an embodiment of the invention, a software system, such as network management tool 330, is pre-loaded on removable media, such as key 310 to add network intelligence to the key for the purpose of assisting with wireless-network security configuration. With the inclusion of this software, and referring now to FIGS. 4 and 5, the key 310 can be used in the following ways: 1) inserted into a network device that is already connected to the home network to automatically extract security settings; and 2) inserted into a device that is not connected to the home network to configure its settings and allow it to join the network automatically.

An embodiment of the invention allows the network management tool 330 to be run by a PC or other device from an external media device, such as key 310, without being installed onto the hard disk of such PC or other device.

Figure 4:
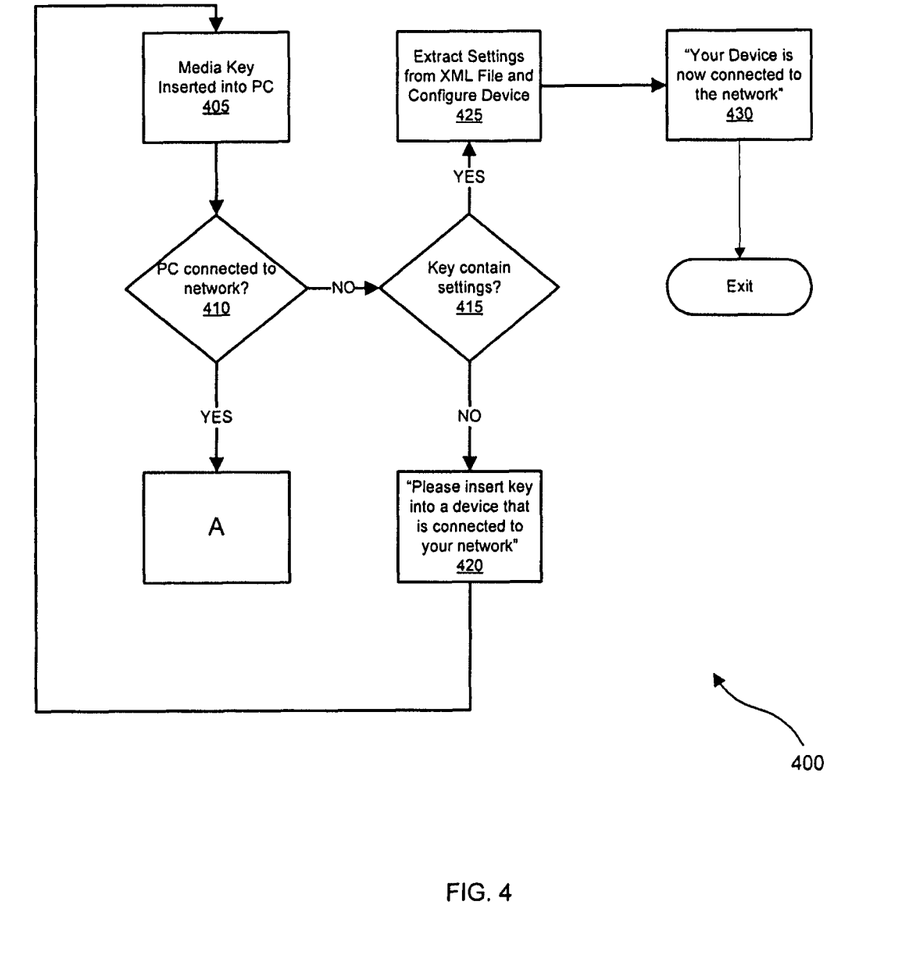
FIGS. 4 and 5 are flowcharts illustrating a process according to an embodiment of the invention.

As such, and referring specifically to a process 400 illustrated in FIG. 4, when a user inserts, at a block 405, the key 310 having the network management tool 330 pre-installed into a computing device 103, a dialog box (not shown) or the like can appear on an associated display (not shown). Such a dialog box may suggest that the user run a "Wireless Setup Wizard" that is pre-installed on the key 310 and which may be a component of the tool 330. If the user elects to run the wizard, the computing device 103 executes the tool 330 from the key 310.

Figure 5:
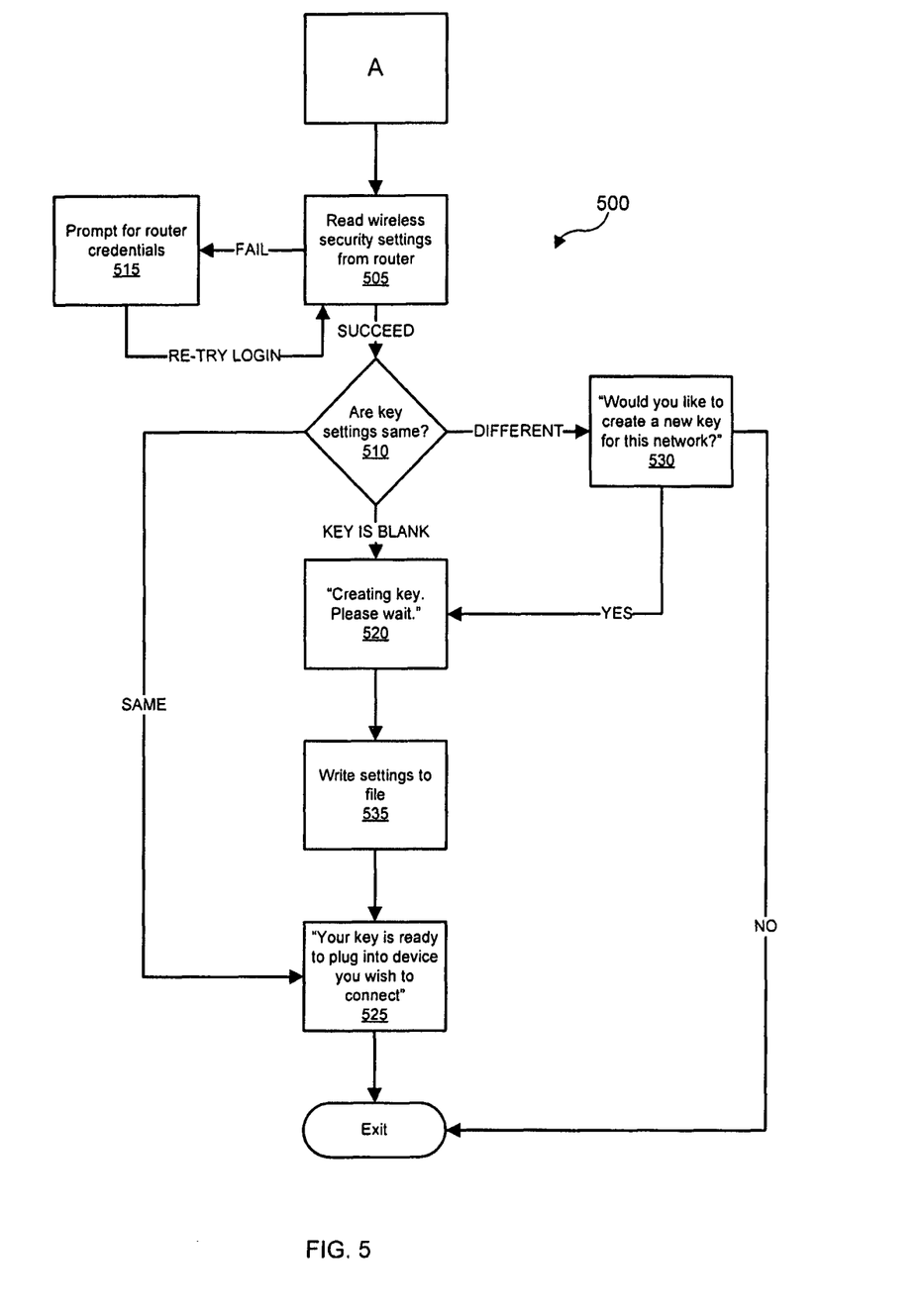

At a block 410, the wizard checks to see if the computing device 103 is connected to an existing home network, such as the network 101. If the computing device 103 is connected to a network, then the process 400 proceeds to a block 505 of a process 500 (FIG. 5). If the computing device 103 is not connected to a network, then the process 400 proceeds to a block 415 discussed in further detail below.

Referring now to FIG. 5, at a block 505, the wizard uses router driver technology associated with the tool 330 to locate, identify and communicate with the gateway 105 of the network 101 of which the computing device 103 is a member. The wizard also attempts to login to the administrative console of the gateway 105 to extract security settings for the network 101. This may be accomplished by employing "screen scraping" drivers that allows the wizard to use an HTML-based web-interface of a router to interact with and read/write the settings associated with the router. Elements of this screen scraping technology are described in one or more of the commonly owned patent applications incorporated by reference elsewhere herein. Alternatively, the wizard may employ principles of the Home Network Administration Protocol (HNAP) if supported by the gateway 105. A typical set of security settings can include the following:

SSID or name of wireless network;
Security Mode (e.g., None, WEP, WPA-PSK, WPA-RADIUS, WPA2-PSK, etc.);
Security key or pass-phrase.
Encryption Method (TKIP/AES)

If the login succeeds and the settings are obtained, the process 500 continues to a block 510. If the login fails due to administrative credentials being incorrect, at a block 515, the wizard can prompt the user for necessary credentials and re-try the login. If, after examining the gateway 105, it is determined that the gateway is a non-wireless device, the wizard may terminate with an error.

After obtaining the settings from the gateway 105, in an embodiment, the wizard looks for a network description file on the key 310 that, for example, is in WCN format. If such a file does not exist (e.g., the key 310 is blank), the wizard, at a block 520, invokes a displayed dialog asking the user to wait while the settings are saved to the key. Simultaneously, at a block 535, the router settings obtained at block 505 are saved to a file (e.g., XML) on the key 310. The process 500 then proceeds to a block 525 described below.

If such a file does exist, and the settings in the file are identical to the network settings obtained from the gateway 105, then, at a block 525, the wizard invokes a displayed dialog instructing the user to plug the key 310 into a device 103 to be joined to the network 101. The process 500 then terminates.

If such a file does exist, but the settings in the file are different from the network settings obtained from the gateway 105, then, at a block 530, the wizard invokes a displayed dialog asking the user if he/she wishes to create a new key for the network (i.e., override the current network settings). If the user answers in the affirmative, then the process 500 continues to block 520. Otherwise, the process 500 terminates.

Referring back to FIG. 4, if the computing device 103 into which the key 310 has been inserted is not connected to the network 101, then the process 400 proceeds to a block 415, wherein the tool 330 inspects the key for the presence thereon of, in an embodiment, a settings configuration XML file in, for example, WCN format.

If such a file is not present, then, at a block 420, the wizard invokes a displayed dialog prompting the user to insert the key 310 into another device that is already connected to the network 101. If the user complies with this request, the process 400 continues to block 405.

If such a file is present, the tool 330 assumes that the user wishes that the device 103 be joined to the network 101. If the device 103 has a wireless network card, and the SSID of the network 101 stored in the file is within range, the tool 330, at a block 425, attempts to join the device 103 to the network 101 using the settings stored in the file. If the tool 330 determines that the device 103 was successfully joined to the network 101, then, at a block 430, the wizard invokes a displayed dialog informing the user of such. The process 400 then terminates.

The processes 400, 500 shown in and described with reference to FIGS. 4 and 5 are illustrated as a set of operations shown as discrete blocks. One or more aspects of these processes 400, 500 may be implemented in any suitable hardware, software, firmware, or combination thereof. As such, such aspects may be implemented in computer-executable instructions that can be transferred from one electronic device (not shown) to a second electronic device, such as a device on network 101, via a communications medium, such as Internet 107.

By way of example, and referring back to FIG. 1, consider how the printer 103D may initially join the wireless network 101 according to an embodiment. The manufacturer of the printer 103D may include a USB key 310 as part of the packaging of the printer 103D. Further, the key 310 may be pre-loaded with the tool 330 of an embodiment of the invention. The instructions packaged with the printer may direct the user to plug the key 310 into a device 103 that is already joined to the network 101 and follow the instructions displayed on an associated display device. The user plugs the key 310 into a USB port of the computer 103B and is presented with a wizard that the computer 103B runs from the key. The tool 330 locates, communicates with and extracts security credentials from the gateway device 105. These security credentials and the network name may be then written onto the key 310 in an XML file. The user is then instructed to unplug the key 310 from the computer 103B and plug the key into the printer 103D. The printer 103D reads the settings from the XML file stored on the key 310 and, by executing the instructions stored on the key, uses the settings to join the network 101.

Optionally advantageous aspects of at least one embodiment of the invention include the notion of a binary that can run from a removable media device, such as a key, that can automatically extract settings associated with a network. The key is agnostic to the type of router installed. The key is also intelligent enough to know if the device is or is not connected to a network, and if previous settings have been stored on the key.

While embodiments of the invention have been described with respect to specific examples including presently preferred modes of carrying out the invention, those skilled in the art will appreciate that there are numerous variations and permutations of the above described systems and techniques that fall within the spirit and scope of the invention as described herein.

What is claimed is:

1. An article of manufacture, comprising:
   an interface component configured to couple to a first computer, the first computer being part of a home network having a gateway device to which multiple end user devices are coupled using wireless security settings for the home network; and
   a key configured to couple to the first computer and to extract the wireless security settings for the home network in response to the first computer being connected to the home network, wherein the key includes computer-implementable instructions that, when executed by a processor, output network-device-setup instructions to a display device coupled to the first computer in response to the first computer not being connected to the home network, wherein one of the network-device-setup instructions includes a notification that the first computer is not connected to the home network, and wherein the key is configured to be physically coupled to a second computer and to load the wireless security settings for the home network from the first computer into the second computer without communicating with the first computer or the gateway device.

2. The article of claim 1 wherein the interface component is configured to physically couple with the first computer.

3. The article of claim 1, wherein:
   the interface component is configured to couple to an electronic device to enable the electronic device to join the network; and
   the computer-implementable instructions, when executed by a processor in the electronic device, perform the step of joining the electronic device to the network using gathered network configuration information from the gateway.

4. The article of claim 1, further comprising:
   gathering network configuration information, wherein gathering the network configuration information comprises writing the information to the memory component in an extensible markup language file.

5. The article of manufacture of claim 1, further comprising:
   communicating an instructing to insert the key into a third device that is connected to the home network if the first computer is not connected to the home network.

6. The article of manufacture of claim 1, wherein the key is a universal serial bus (USB) key.

7. The article of manufacture of claim 1, wherein the network-device-setup instructions include instructions to load the wireless security setting for the home network and connect the first computer to the home network using the key if the key includes the wireless security settings for the home network and instructions to obtain the wireless security setting and connect the first computer to home network if the key does not include the wireless security settings for the home network.

8. An article of manufacture, comprising:
   an interface component configured to couple to an electronic device that contains wireless security settings for a network having a gateway device to which multiple end user devices are coupled, wherein the electronic device includes wireless security settings for the home network; and
   a key having a memory component containing non-transitory computer-implementable instructions that, when executed by a processor in the electronic device, extracts the wireless security settings for the network in response to the electronic device being connected to the home network and outputs network-device-setup instructions to a display device coupled to the electronic device in response to the electronic device not being connected to the home network, wherein one of the network-device-setup instructions includes a notification, and wherein the key is configured to be inserted into a personal computer to load the wireless security settings from the electronic device for the network into the personal computer without communicating with the gateway device or the electronic device.

9. The article of claim 8 wherein the interface component is configured to physically couple with the electronic device.

10. The article of claim 8 wherein:
    the interface component is configured to couple to a computer, the computer being part of the network; and
    the computer-implementable instructions, when executed by the processor in the computer, perform the step of gathering network configuration information from a gateway device.

11. The article of claim 10 wherein gathering the network configuration information comprises writing the information to the memory component in an extensible markup language file.

12. A system, comprising:
    a network component; and
    a key, comprising:
       an interface component configured to couple to a computer, the computer being part of a network having a gateway device, wherein the computer contains wireless security settings for the network; and
       a memory component containing non-transitory computer-implementable instructions that, when executed by a processor in the computer, extracts wireless security settings for the network from the computer in response to the computer being connected to the home network and outputs network-device-setup instructions to a display device coupled to the first computer in response to the computer not being connected to the home network, wherein one of the network-device-setup instructions includes a notification that the first computer is not connected to the home network, and wherein the key is configured to be inserted into a first electronic device to load the wireless security settings from the computer for the network into the first electronic device without communicating with the computer or the gateway device.

13. The system of claim 12 wherein the interface component is configured to physically couple with the computer.

14. The system of claim 12, wherein:
    the interface component is configured to couple to a network component; and
    the computer-implementable instructions, when executed by the network component, perform the step of joining the network component to the network using the gathered network configuration information.

15. The system of claim 12 wherein the first electronic device comprises a printer.

16. A method comprising the steps of:
connecting a key to a first computer that includes wireless security settings for a network, wherein the network includes a gateway device, the key configured to obtain the wireless security settings for the network from the first computer in response to the first computer being connected to the network and to output network-device-setup instructions to a display device coupled to the first computer in response to the first computer not being connected to the network, wherein one of the network-device-setup instructions includes a notification that the first computer is not connected to the home network; and
connecting the key to a second computer, wherein the key is configured to load the wireless security settings for the network into the second computer without communicating with the first computer or the gateway device.

17. The method of claim 16 wherein the computer-executable instructions, when executed by the second computer, perform the step of joining the second computer to the network using the gathered network configuration information.

* * * * *